(12) United States Patent
Hanghöj et al.

(10) Patent No.: US 8,109,458 B2
(45) Date of Patent: Feb. 7, 2012

(54) ROLLING BEARING

(75) Inventors: Sören Hanghöj, Köpenhamn Ö (DK); Rasmus Thranberg Nissen, Gentofte (DK)

(73) Assignee: FLSmidth A/S, Valby (DK)

( * ) Notice: Subject to any disclaimer, the term of this patent is extended or adjusted under 35 U.S.C. 154(b) by 86 days.

(21) Appl. No.: 12/665,394

(22) PCT Filed: Apr. 28, 2008

(86) PCT No.: PCT/EP2008/055164
§ 371 (c)(1),
(2), (4) Date: Dec. 18, 2009

(87) PCT Pub. No.: WO2009/000575
PCT Pub. Date: Dec. 31, 2008

(65) Prior Publication Data
US 2010/0200684 A1    Aug. 12, 2010

(30) Foreign Application Priority Data
Jun. 27, 2007  (DK) .................................. 2007 00926

(51) Int. Cl.
*B02C 23/00* (2006.01)
*F16C 33/34* (2006.01)
(52) U.S. Cl. ...................................... 241/117; 384/565
(58) Field of Classification Search .................. 241/117, 241/121, 118; 384/565, 456, 548, 568, 551
See application file for complete search history.

(56) References Cited

U.S. PATENT DOCUMENTS
2,388,424 A    11/1945 Lund
(Continued)

FOREIGN PATENT DOCUMENTS
DE    2931552 A1    2/1981
(Continued)

OTHER PUBLICATIONS
PCT International Preliminary Report for PCT/EP2008/055164, Nov. 26, 2008.
(Continued)

*Primary Examiner* — Faye Francis
(74) *Attorney, Agent, or Firm* — Buchanan Ingersoll & Rooney PC

(57) ABSTRACT

Described is a rolling bearing (1) for a rocker arm, said rolling bearing comprising an at least partly circular outer part (2), an at least partly circular inner part (3) and a number of rolling elements (5) which are fitted between the outer part (2) and the inner part (3). The rolling bearing is peculiar in that at least one of the rolling elements (5) comprises two opposite, curved side faces (6, 7), which viewed in at least one cross-sectional constitutes arc lengths of the same imaginary circle (10), and which constitutes contact faces for the outer and the inner circular part (2, 3) respectively, and at least one side surface (8, 9), which lies within the mentioned imaginary circle (10).

It is hereby obtained that the number of rolling elements in the bearing can be increased, thereby reducing the load on each single rolling element subject to the same total load rate, thereby increasing the total load bearing capacity of the bearing. This is due to the fact that at least a part of the roller face of the traditional circular rollers which do not get into contact with the outer or inner part of the bearing through small reciprocating angular rotations is omitted thereby significantly reducing the space taken up by each of the rolling elements in the circumferential direction of the bearing.

15 Claims, 3 Drawing Sheets

U.S. PATENT DOCUMENTS

| | | | |
|---|---|---|---|
| 2,848,170 A | | 8/1958 | Crites |
| 2,909,330 A | * | 10/1959 | Hardinge ........................ 241/19 |
| 3,344,998 A | * | 10/1967 | Eft ................................ 241/103 |
| 3,730,446 A | * | 5/1973 | Piepho .......................... 241/110 |
| 4,072,276 A | * | 2/1978 | Romanowski ................ 241/117 |
| 4,327,822 A | * | 5/1982 | Vogele et al. ............... 192/41 A |
| 4,588,311 A | | 5/1986 | Heier et al. |
| 5,152,488 A | | 10/1992 | Richardson |

FOREIGN PATENT DOCUMENTS

| | | |
|---|---|---|
| DE | 19629575 C1 | 8/1997 |

OTHER PUBLICATIONS

PCT International Search Report for PCT/EP2008/055164, Nov. 26, 2008.

PCT Written Opinion for PCT/EP2008/055164, Nov. 26, 2008.

\* cited by examiner

ROLLING BEARING

CROSS-REFERENCE TO RELATED APPLICATIONS

This application is the United States national phase under 35 U.S.C. § 371 of International Application No. PCT/EP2008/055164, filed on Apr. 28, 2008, and claiming priority to Danish Patent Application No. PA200700926, filed on Jun. 27, 2007. Both of those applications are incorporated by reference herein.

BACKGROUND OF THE INVENTION

1. Field of the Invention

The present invention relates to a rolling bearing for a rocker arm, said rolling bearing comprising an at least partly circular outer part, an at least partly circular inner part and a number of rolling elements which are fitted between the outer part and the inner part.

The invention also relates to the use of such a rolling bearing in a roller mill for grinding of particulate material, such as cement raw materials, cement clinker and similar materials, with said roller mill comprising a substantially horizontal grinding table and a roller set capable of revolving about a vertical shaft, said roller set comprising a number of rollers rotating about respective roller shafts which are connected to the vertical shaft via a hinged connection allowing a free circular movement of the roller up and down in a plane including the centreline of the roller shaft, and said roller set being configured for interactive operation with the grinding table.

The rolling bearing according to the invention may be used in any context where it is essential that a rocker arm or shaft has the capability to move back and forth at relatively small angular rotations, and, therefore, it is particularly suitable for use in connection with the hinged connection in roller mills of the aforementioned known kind.

2. Background of the Art

In the known roller mills, the hinged connection which connects the roller shaft with the vertical shaft is typically made up of a traditional slide bearing which may be lubricated by means of a suitable lubricant. It is the function of the hinged connection to ensure that the rollers, independently of one another, have the ability to follow the height variations of the material bed deposited on the grinding table during the operation of the mill. With respect to direction and size, the force which is to be absorbed by the hinged connection is virtually constant relative to the bearing journal the angular rotation of which is generated by the variations in the thickness of the material bed, and typically maintained within an interval of ±0.5 to 5 degrees. The frequency of the angular rotation of the bearing journal will typically be within the interval of 0.5 to 1 Hz. If the known roller mill is used for grinding of particulate material, such as cement raw materials, cement clinker and similar materials, the hinged connection will be subjected to a relatively high pressure which, due to frictional forces between the parts of the hinged connection, will give rise to undesirable heat generation not immediately reducible by means of a lubricant because of the unilateral constant stress loading and the very small angular rotations back and forth of the bearing journal will not be sufficient to draw the lubricant into the zone of loading. Of other commercially available bearing types mention can be made of a hydrodynamic slide bearing which cannot be used since there is no continuous rotation of the bearing journal, hence preventing the formation of a hydrodynamic lubricating film, as well as a hydrostatic radial bearing which from a technical viewpoint is a perfect bearing solution which gives full support both in the static condition and subject to rotation, but its drawback is that it is too complicated, sensitive and expensive. Nor are traditional rolling bearings comprising an outer and an inner ring and circular-cylindrical rollers fitted in between deemed to be suitable for the purpose, partly because the small angular rotations will not allow the rollers to draw lubricant into the loading zone and partly because the circular-cylindrical form of the rollers only make it possible to incorporate a limited number of supporting rollers in the bearing, resulting in a significant load rate on each supporting roller. So, the fact remains that none of the traditional, commercially available bearing types are deemed to be directly suitable for the described load condition without giving rise to significant disadvantages.

BRIEF SUMMARY OF THE INVENTION

This is obtained by a rolling bearing of the kind mentioned in the introduction, and being characterized in that at least one of the rolling elements comprises two opposite, curved side faces, which viewed in at least one cross-sectional constitutes arc lengths of the same imaginary circle, and which constitutes contact faces for the outer and the inner circular part respectively, and at least one side surface, which lies within the mentioned imaginary circle.

It is hereby obtained that the number of rolling elements in the bearing can be increased, thereby reducing the load on each single rolling element subject to the same total load rate, thereby increasing the total load bearing capacity of the bearing. This is due to the fact that at least a part of the roller face of the traditional circular rollers which do not get into contact with the outer or inner part of the bearing through small reciprocating angular rotations is omitted thereby significantly reducing the space taken up by each of the rolling elements in the circumferential direction of the bearing.

The at least one side surface of the rolling element which is within the imaginary circle may assume any appropriate shape, such as curved, plane etc. However, it is preferred that this side surface be plane and that it constitutes a chord in the imaginary cross-sectional circle. If the shape of the side surface is not plane, the opposite side surface should be complementary in the extreme position of the bearing for attainment of a satisfactory contact face between two adjacent rolling elements when the bearing assumes this position.

To minimize the space occupied by the rolling element in the circumferential direction of the bearing it is preferred that it comprises two opposite, plane side surfaces, each, when viewed cross-sectionally, constituting a chord in the imaginary circle. The two chords may be parallel, but in order to provide a good contact surface between two adjacent rolling elements when the bearing is in an extreme position subject to the maximum required angular rotation, and hence a self-locking effect, it is preferred that the two chords form a smaller angle between them so that the width of the rolling elements is greatest near the outer circular part. The size of the angle between the chords depends primarily on the number of rolling elements in the bearing which in turn depends on the required maximum angular rotation of the bearing. The smaller the required angular rotation of the bearing is, the shorter the arc lengths of the curved contact faces of the rolling elements with the outer and inner circular part, respectively, will have to be, and the higher is the number of rolling elements which can be accommodated. In for example an embodiment according to which the required angular rotation is plus/minus 3 degrees, the number of rolling elements can be doubled in relation to traditional rolling bearings.

In a particular embodiment of the rolling bearing according to the invention which is especially suitable for use when the bearing is subject to one-sided stress loading, a part of the rolling elements may be replaced by an annular element which may either be fixed by suitable means to either the outer or the inner circular part or it may be an integral part of one of these two circular parts. The annular element may be configured so that it extends over an area of up to about 90% of the circumference and with a radial extension so that an annular gap is present between the annular element and one of the circular parts. The annular element may further be advantageously formed with oblique end faces in order to ensure satisfactory contact with the adjacent rolling elements when the bearing is in an extreme position subject to the maximum required angular rotation, and hence a self-locking effect.

The rolling element may further advantageously comprise a roller holder for retaining the position of the rolling elements relative to each other in the circumferential direction.

BRIEF DESCRIPTION OF THE SEVERAL VIEWS OF THE DRAWINGS

The invention will now be described in further details with reference to the drawing, being diagrammatical, and where.

DETAILED DESCRIPTION OF THE INVENTION

Figure 1:
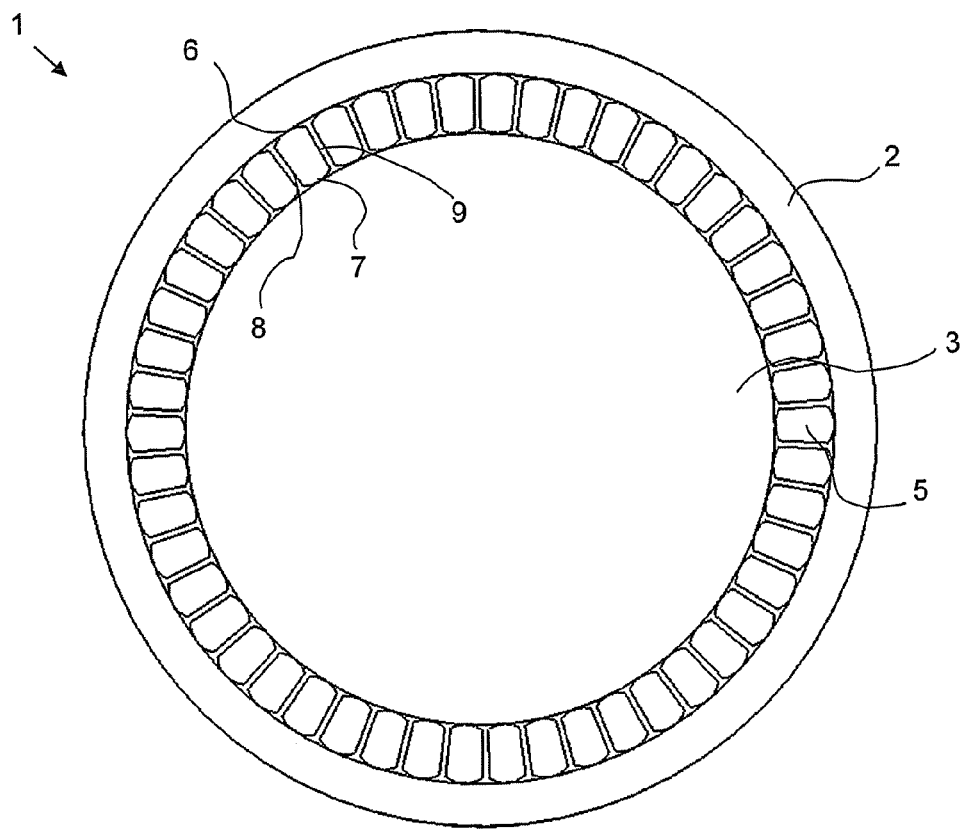
FIG. 1 shows a sectional view of a rolling bearing according to the invention viewed from the side.

In FIG. 1 is seen a rolling bearing 1 according to the invention which comprises an outer circular part 2, an inner circular part 3 and a number of rolling elements 5 which are fitted between the outer part 2 and the inner part 3.

Figure 2:
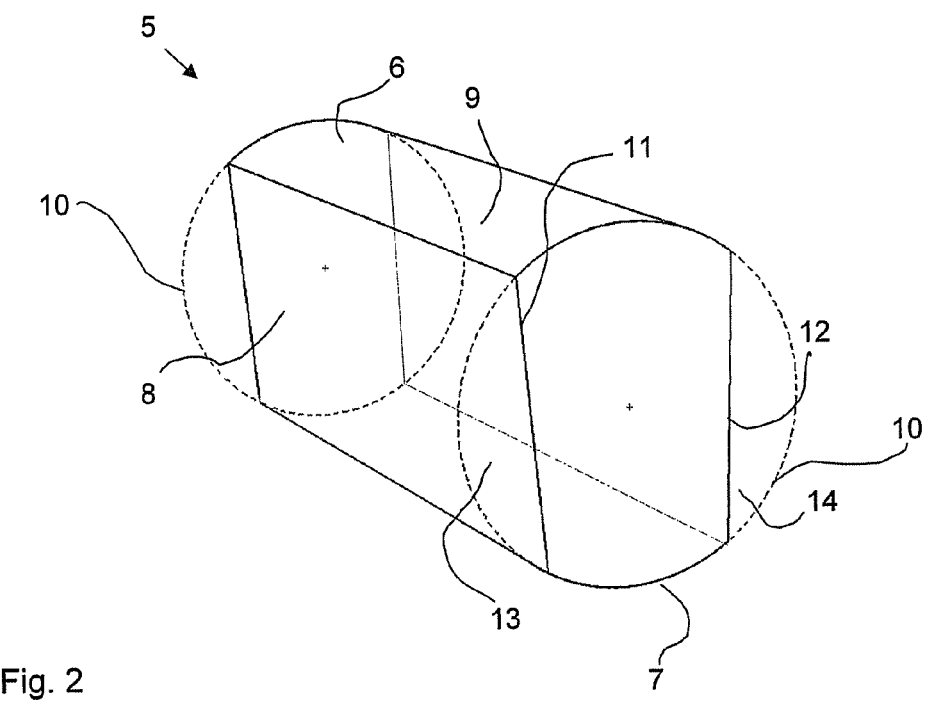
FIG. 2 shows a rolling element for a rolling bearing according to the invention.

As is best illustrated in FIG. 2, the rolling elements 5 in the shown embodiment of the invention are formed as rods, each of which comprises four side faces 6, 7, 8 and 9, of which two opposite faces are curved side faces 6 and 7 which constitute arc lengths of the same imaginary circle 10, and which in the rolling bearing forms contact surfaces with the outer and the inner circular part 2, 3, respectively, and of which the two other opposite side faces 8 and 9 lie within the mentioned imaginary circle 10, being plane and facing respective adjacent rolling elements 5 as shown inter alia in FIG. 1.

Figure 3:
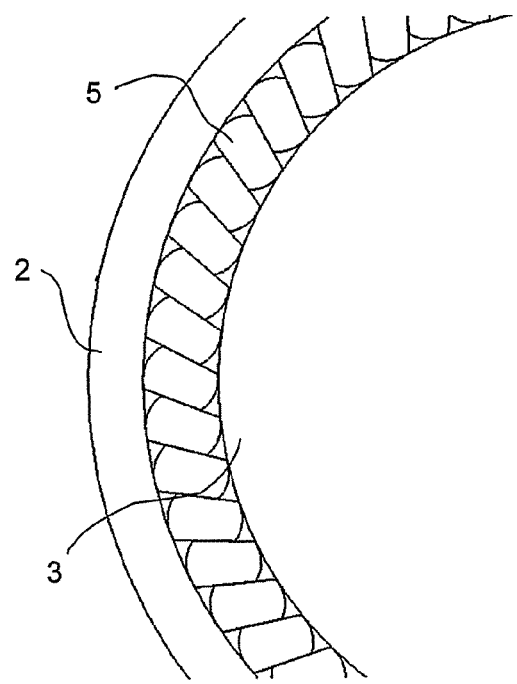
FIG. 3 shows a section of a rolling bearing according to the invention where the bearing is in an extreme position subject to the maximum required angular rotation.

Viewed cross-sectionally, each of the plane side faces 8 and 9 describe a chord 11, 12 in the imaginary circle 10. With reference to FIG. 2, the rolling elements 5 may in other words be described as being formed as cylindrical rollers with an imaginary circular cross-section, shown by the circle 10, where two opposite cylinder sections 13 and 14 which are defined respectively by the chords 11 and 12 and the arc lengths of the circle 10 have been cut away. The two chords may be parallel but in order to provide a good contact face between two adjacent rolling elements 5 when the bearing is in an extreme position subject to the maximum required angular rotation, as shown in FIG. 3, and hence a self-locking effect, the two chords 11, 12 form a smaller angle between them so that the greatest width of the rolling elements occurs near the outer circular part 2. The size of the angle between the chords 11, 12 depend primarily on the number of rolling elements 5 in the bearing, which in turn depends on the required maximum angular rotation of the bearing. The smaller the required angular rotation of the bearing is, the shorter the arc lengths of the curved contact surfaces of the rolling elements 5 with respectively the outer and the inner circular part 2, 3 will have to be, and the higher is the number of rolling elements which can be accommodated.

Figure 4:
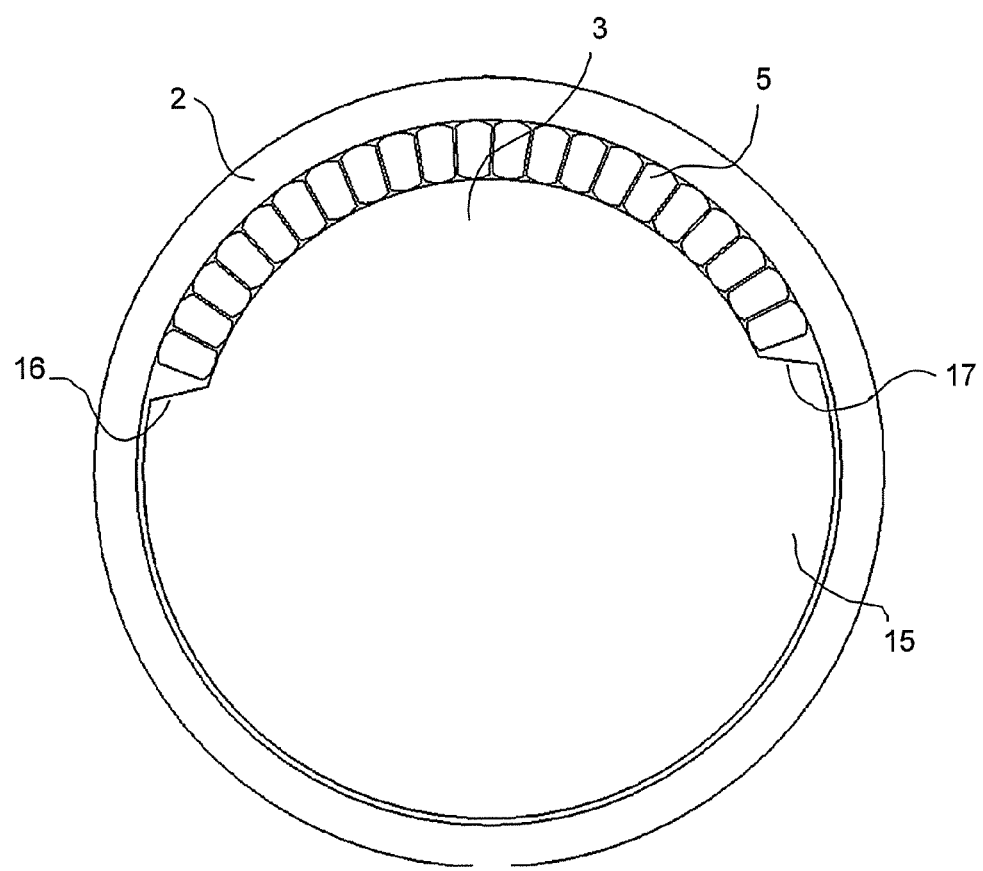
FIG. 4 shows a special embodiment of the bearing according to the invention.

In the embodiment shown in FIG. 4 for the rolling bearing according to the invention which is particularly suitable for application in connection with one-sided stress loading of the bearing, some of the rolling elements 5 have been replaced by an annular element 15, which in the shown embodiment constitutes an integral part of the inner circular part 3. The annular element 15 is, as shown, configured with a radial extension which is smaller than the distance between the two circular parts 2, 3, so that an annular gap is present between the annular element 15 and the outer circular part 2. The annular element is also provided with oblique end faces 16, 17, thereby ensuring that the adjacent rolling elements 5, when the bearing is in an extreme position subject to the maximum required angular rotation, are in good contact with the annular element 15, hence ensuring a self-locking effect of the bearing.

Figure 5:
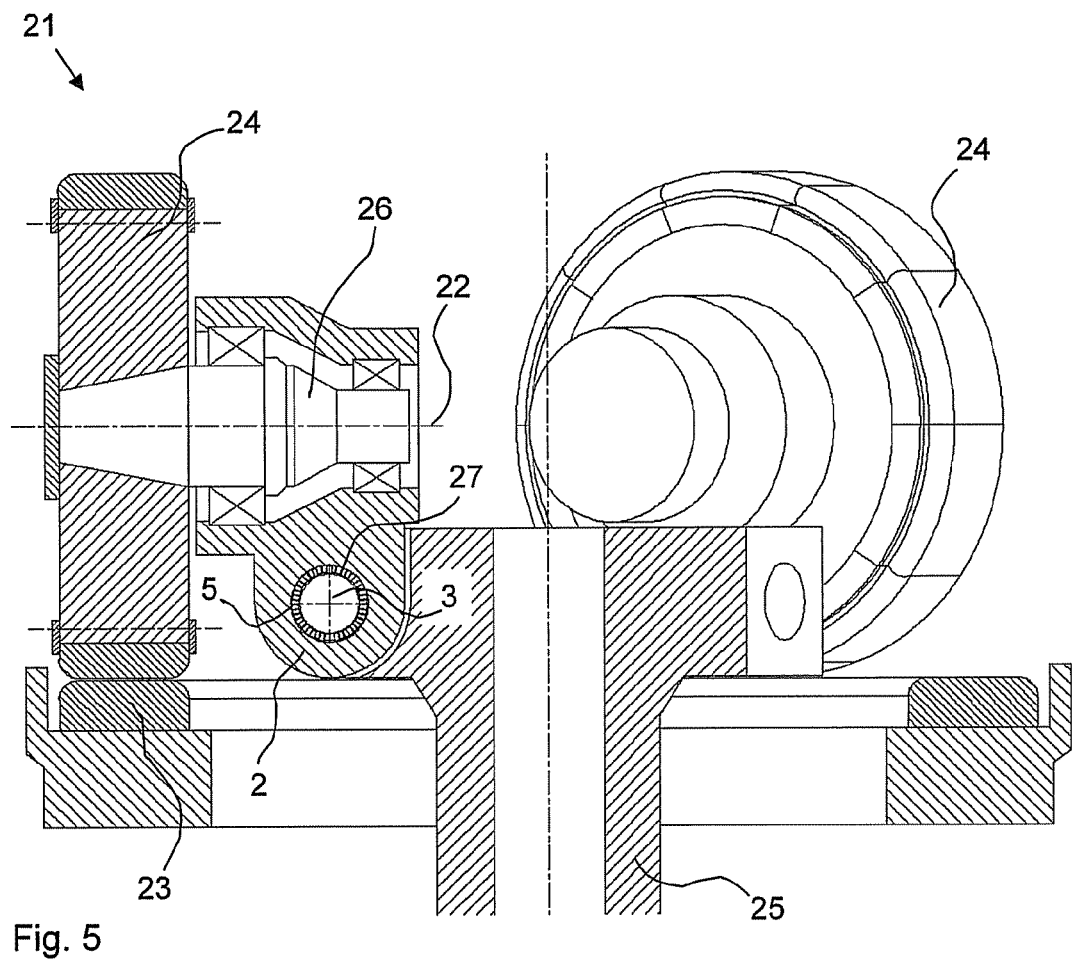
FIG. 5 shows the application of the bearing according to the invention in a roller mill.

In FIG. 5 is seen an example as to the use of the bearing according to the invention. FIG. 5 shows a sectional view of a roller mill 21 which comprises a horizontal grinding table 23 and a set of rollers 24 operating interactively with the grinding table, and being connected to and rotating about a vertical shaft 25. The rollers 24 rotate about respective roller shafts 26, which are connected to the vertical shaft 25 via a hinged connection 27, thereby allowing the roller 24, when rotating about the hinged connection, to move up and down in a plane comprising the centreline 22 of the roller shaft. As shown, the hinged connection 27 comprises a roller bearing 1 according to the invention.

In the description provided, the outer part 2 and the inner part 3 of the bearing and the rolling elements 5 are described as having identical dimensions over their entire length. However, it is a foregone conclusion that alternative embodiments will also be conceivable within the framework of the present invention. For example, the outer part 2 and the inner part 3 of the bearing and the rolling elements 5 may be conically or spherically configured in their longitudinal direction.

The invention claimed is:

1. A rolling bearing for a rocker arm, said rolling bearing comprising:
   an outer part;
   an inner part; and
   a plurality of rolling elements positioned between the outer part and the inner part, each of the rolling elements comprising:
      a first side, the first side defining a contact face for the outer part,
      a second side opposite the first side, the second side defining a contact face for the inner part;
      a third side, and
      a fourth side opposite the third side,
      the first side defining a curved face having arc lengths on opposite sides of the curved face, the arc lengths being arc lengths of a same imaginary circle when viewed in cross section, the arc lengths of the first side each having a first terminal end adjacent the third side and a second terminal end adjacent the fourth side, the second side defining a curved face having arc lengths on opposite sides of the curved face of the second side, the arc lengths of the second side being arc lengths of a same imaginary circle when viewed cross sectionally; the arc lengths of the second side each having a first terminal end adjacent the third side and a second terminal end adjacent the fourth side, the third side extending from between the first terminal ends of the arc lengths of the first side to between the first terminal ends of the arc lengths of the second side to define a planar cord portion of the rolling element;

the fourth side extending between the second terminal ends of the arc lengths of the first side to between the second terminal ends of the arc lengths of the second side to define a planar cord portion of the rolling element; and the cord portions defined by the third and fourth sides extending between the first and second sides define a width of the rolling element such that the width of the rolling element adjacent the first side is greater than the width of the rolling element adjacent the second side.

2. A rolling bearing according to claim 1, said rolling bearing comprising an annular element which is arranged between the inner part and the outer part, the annular element also being positioned between two of the rolling elements.

3. A rolling bearing according to claim 2, wherein the annular element extends over an area of up to about 90% of a periphery of the rolling bearing and defines an annular gap between the annular element and one of the inner part and the outer part.

4. A rolling bearing according to claim 3, wherein the annular element has oblique end faces to contact with the rolling elements adjacent to each of the oblique end faces when the bearing is in an extreme position subject to a maximum angular rotation such that the oblique end faces provide a self-locking with the rolling elements contacting the oblique end faces of the annular element.

5. A roller mill for grinding of particulate material comprising a substantially horizontal grinding table and a roller set capable of revolving about a vertical shaft, said roller set comprising a number of rollers rotating about respective roller shafts which are each connected to the vertical shaft via a hinged connection allowing a free circular movement of the roller up and down relative to a centerline of the roller shaft, and said roller set being configured for interactive operation with the grinding table, wherein the hinged connection comprises a rolling bearing of claim 4.

6. A roller mill for grinding of particulate material comprising a substantially horizontal grinding table and a roller set capable of revolving about a vertical shaft, said roller set comprising a number of rollers rotating about respective roller shafts which are each connected to the vertical shaft via a hinged connection allowing a free circular movement of the roller up and down relative to a centerline of the roller shaft, and said roller set being configured for interactive operation with the grinding table, wherein the hinged connection comprises a rolling bearing of claim 3.

7. A roller mill for grinding of particulate material comprising a substantially horizontal grinding table and a roller set capable of revolving about a vertical shaft, said roller set comprising a number of rollers rotating about respective roller shafts which are each connected to the vertical shaft via a hinged connection allowing a free circular movement of the roller up and down relative to a centerline of the roller shaft, and said roller set being configured for interactive operation with the grinding table, wherein the hinged connection comprises a rolling bearing of claim 2.

8. A rolling bearing according to claim 1, said rolling bearing comprising a roller holder that retains a position of each of the rolling elements relative to each other.

9. A roller mill for grinding of particulate material comprising a substantially horizontal grinding table and a roller set capable of revolving about a vertical shaft, said roller set comprising a number of rollers rotating about respective roller shafts which are each connected to the vertical shaft via a hinged connection allowing a free circular movement of the roller up and down relative to a centerline of the roller shaft, and said roller set being configured for interactive operation with the grinding table, wherein the hinged connection comprises a rolling bearing of claim 8.

10. A roller mill for grinding of particulate material comprising a substantially horizontal grinding table and a roller set capable of revolving about a vertical shaft, said roller set comprising a number of rollers rotating about respective roller shafts which are each connected to the vertical shaft via a hinged connection allowing a free circular movement of the roller up and down relative to a centerline of the roller shaft, and said roller set being configured for interactive operation with the grinding table, wherein the hinged connection comprises a rolling bearing of claim 1.

11. The roller bearing of claim 1 wherein the width adjacent the first side is the width at the first side and the width adjacent the second side is the width at the second side.

12. The roller bearing of claim 1 further comprising an annular element positioned between the inner part and the outer part, the annular element having a first oblique end face and a second oblique end face; and wherein the rolling elements are comprised of a first rolling element, a second rolling element and a third rolling element, the second rolling element positioned between the first and third rolling elements; and wherein the first rolling element positioned adjacent the first oblique end of the annular element such that the third side of the first rolling element contacts the first oblique end when the rolling bearing is in an extreme position due to a maximum angular rotation occurring such that the first oblique end self locks with the first rolling element; and wherein the third rolling element is positioned adjacent the second oblique end of the annular element such that the fourth side of the third rolling element contacts the second oblique end when the rolling bearing is in an extreme position due to a maximum angular rotation occurring such that the second oblique end self locks with the third rolling element.

13. The rolling bearing of claim 12 wherein the rolling elements comprise a fourth rolling element and a fifth rolling element, the fourth rolling element positioned between the first and second rolling elements and the fifth rolling element positioned between the second and third rolling element.

14. The rolling bearing of claim 13 further comprising a roller holder that retains a position of each of the rolling elements relative to each other.

15. The rolling bearing of claim 1 wherein the width of each of the rolling element is greatest at the first side.

* * * * *